(12) United States Patent
Gilbert et al.

(10) Patent No.: US 7,639,948 B2
(45) Date of Patent: Dec. 29, 2009

(54) SYSTEM AND METHOD FOR WAVE VECTOR MULTIPLEXED LASER COMMUNICATION

(75) Inventors: Gerald N. Gilbert, Manalapan, NJ (US); Michael D. Hamrick, Eatontown, NJ (US); Martin A. Jaspan, Arlington, MA (US); Jayson L. Cohen, Ann Arbor, MI (US); Anthony Donadio, Matawan, NJ (US); Alexander J. Dufort, Clark, NJ (US)

(73) Assignee: The MITRE Corporation, McLean, VA (US)

( * ) Notice: Subject to any disclaimer, the term of this patent is extended or adjusted under 35 U.S.C. 154(b) by 286 days.

(21) Appl. No.: 11/115,198

(22) Filed: Apr. 27, 2005

(65) Prior Publication Data

US 2005/0238356 A1 Oct. 27, 2005

Related U.S. Application Data

(60) Provisional application No. 60/565,531, filed on Apr. 27, 2004.

(51) Int. Cl.
*H04J 14/02* (2006.01)
*H04B 10/10* (2006.01)
*H04B 10/30* (2006.01)

(52) U.S. Cl. .................................. 398/96; 398/131
(58) Field of Classification Search ............. 398/55–57, 398/118–131, 96
See application file for complete search history.

(56) References Cited

U.S. PATENT DOCUMENTS 3,574,439 A * 4/1971 Gloge et al. ................ 385/147
5,532,858 A * 7/1996 Hirohashi et al. ............. 398/57
5,777,768 A * 7/1998 Korevaar .................... 398/129
6,694,101 B1 * 2/2004 Wingo ....................... 398/130
7,292,788 B2 * 11/2007 Triebes et al. .............. 398/122
2005/0129407 A1 * 6/2005 Coleman .................... 398/130

OTHER PUBLICATIONS

Gilbert, G. et al. "Practical Quantum Cryptography: A Comprehensive Analysis (Part One)." Mitre Technical Report. Sep. 2000. arXiv:quant-ph/0009027v1. submitted on Sep. 7, 2000.*
Gisin, N. et al. "Quantum cryptography." Reviews of Modern Physics, vol. 74, Jan. 2002: 145-195. Issue 1—Mar. 2002.*
Willebrand, H.A. and B.S. Ghuman. "Fiber optics without fiber." IEEE Spectrum, vol. 38, No. 8, Aug. 2001: 40-45.*

(Continued)

*Primary Examiner*—Leslie Pascal
(74) *Attorney, Agent, or Firm*—Sterne, Kessler, Goldstein & Fox P.L.L.C.

(57) ABSTRACT

Wave vector division multiplexing ("WVDM") is a method of free-space multiplexing for optical communications. In WVDM, wave vectors of individual laser beams are manipulated so that each individual laser beam has a unique wave vector. These individual laser beams are multiplexed into an aggregate beam, which is transmitted to a receiver. The receiver separates the individual laser beams on the basis of their unique wave vectors. One area where WVDM is useful is in quantum cryptography. WVDM can also be combined with traditional wavelength division multiplexing ("WDM") to increase throughput even further.

24 Claims, 12 Drawing Sheets

OTHER PUBLICATIONS

Mitre Technical Report, "Secrecy, Computational Loads and Rates in Practical Quantum Cryptography," G. Gilbert et al., May 2001.

Mitre-News and Events—Mitre Publications—The Mitre Digest, "Mitre's Quantum Information Program Picks Up Speed," Dec. 2002, 4 pages, http://www.mitre.org/news/digest/advanced_research/12_02/ar_quantum_info.html.

Mitre—News and Events—Mitre Publications—The Edge—Jan. 2002, "Pushing the Frontier of Science: Quantum Cryptography Research at Mitre," Gerald Gilbert, 3 pages http://web.archive.org/web/20040224221152/http://www.mitre.org/news/the_edge/janury_02/gilbert2.html.

Physical Review A vol. 67, Feb. 24, 2003, "Near-field Turbulence Effects on Quantum-Key Distribution," Jeffrey H. Shapiro, pp. 022309-1-022309-7.

* cited by examiner

SYSTEM AND METHOD FOR WAVE VECTOR MULTIPLEXED LASER COMMUNICATION

BACKGROUND OF THE INVENTION

1. Field of the Invention

The present invention relates to the field of free-space optical communications.

2. Related Art

Throughput in current free-space optical communications systems is limited by the number of channels that can be transmitted and detected at any given time. In particular, throughput for quantum cryptography is very slow because each channel has an average intensity of one photon per pulse, and the rate at which such pulses can practically be generated is necessarily constrained by the rate at which photons can be detected.

Current methods of increasing the throughput of free-space optical systems are prohibitive in various ways. Traditional uniplex systems, which allow for transmission of only one channel per system, can be accumulated so that multiple signals are transmitting simultaneously. This is cost and space prohibitive, however, because it requires a complete transmitter and receiver set for each channel.

Wavelength division multiplexing ("WDM") is another method of increasing the throughput of laser communications. In WDM, data is encoded on light sources having different wavelengths. The light sources of different wavelengths are then combined into a cohesive output beam. Upon reception, the beam can be separated using wavelength filters. Although WDM allows for some increase in data throughput, the increase is limited. As the number of wavelengths increases, a phenomenon called "cross-talk" begins to occur. Beams whose wavelengths are close to one another begin to bleed together. Once cross-talk occurs between two beams, the data carried by those beams becomes corrupt.

What is needed is a method of multiplexing in a free-space optical communications system that is scalable to a large number of simultaneous transmissions. What is also needed is a method of multiplexing that is capable of being implemented in a quantum cryptography system.

SUMMARY OF THE INVENTION

Wave vector division multiplexing ("WVDM"), allows free-space multiplexing for optical communications. In WVDM, data can be encoded into a plurality of, for example, laser beams. Through a controlled process, each laser beam can be manipulated so as to change the orientation of the wave vector. Such a manipulation can be accomplished through a series of mirrors and/or lenses oriented to control the wave vector. If the output wave vector orientations are close to parallel, the plurality of beams can be combined into an aggregate beam having several wave vectors within the same spatial region. Since the individual beams, however, retain their individual wave vectors, the data encoded in the individual beams is not compromised through interaction or combination with other beams.

When the aggregate beam is received by a receiver, the individual beams can be separated on the basis of differences between their wave vectors. This separation can be accomplished, for example, using a set of mirrors oriented to manipulate the individual wave vectors. The data encoded in the separate beams can then be separately detected.

One of the many types of optical communication in which WVDM can be used is quantum cryptography. In a quantum cryptography system, individual beams typically have an average intensity of one photon per pulse or less. These photon streams are polarized and conditioned prior to wave vector manipulation. Using WVDM, multiple photon streams can be simultaneously transmitted to increase the data throughput at the receiver. The specific descriptions herein pertaining to generating and controlling polarization states of individual photons are unique to the quantum cryptographic application of WVDM and may not be required in other WVDM applications.

WVDM can be combined with other throughput-increasing methods, such as WDM. As mentioned above with respect to WDM, beams of different wavelengths are combined to produce a single light beam. The components of the light beam can share the same wave vector, since the data can be separated based on wavelength. WVDM can be used in conjunction with WDM to create multiple light beams, wherein each light beam has multiple wavelengths and its own unique wave vector.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Figure 1:
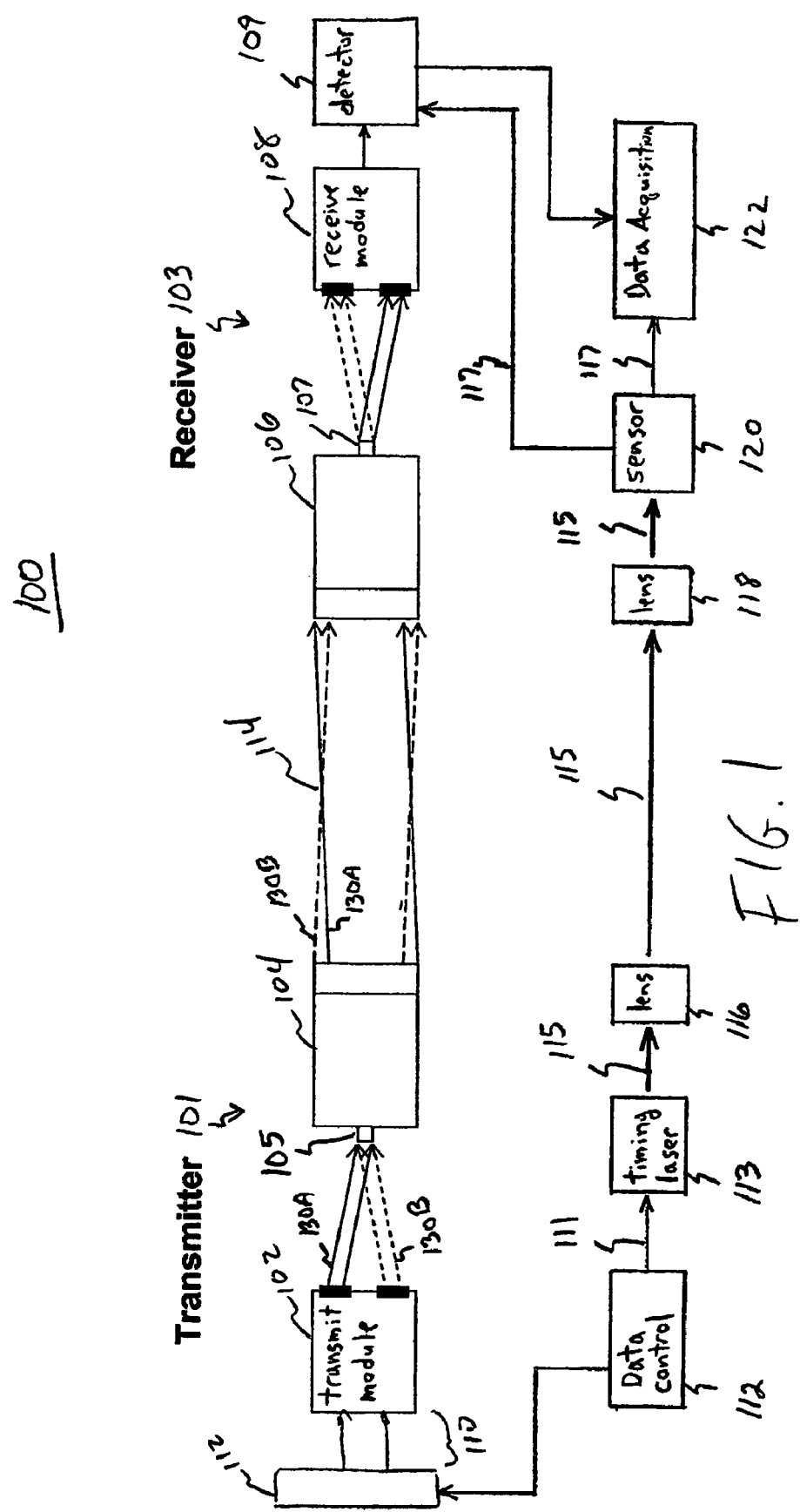
FIG. 1 is a block diagram of a multiplexing system according to an embodiment of the present invention.

Table of Contents
I. Overview
  A. Uniplex Laser Communications
  B. Quantum Cryptography
  C. Wavelength Division Multiplexing
II. Wave Vector Division Multiplexing
III. Application of WVDM to Quantum Cryptography
  A. Method and System Components
  B. Practical Implementation of a Specific Embodiment
IV. Combination of WVDM and WDM
V. Conclusion

I. Overview

While specific configurations and arrangements are discussed, it should be understood that this is done for illustrative purposes only. A person skilled in the relevant art will recognize that other configurations and arrangements can be used without departing from the spirit and scope of the present invention. It will be apparent to a person skilled in the relevant art that this invention can also be employed in a variety of other applications.

A. Uniplex Laser Communications

Uniplex laser communications are communications transmitted via a single laser beam. Because the information carrying capacity of a single beam is limited, the rate of data transfer with uniplex laser systems is also limited. There are two types of laser communications, either of which can be uniplex: fiber optic and free-space. With fiber optic communication, a light-transmissive cable, typically surrounded by a light-blocking shield, links the transmitter and receiver. Because of the light-blocking shield, the light that arrives at the receiving end is almost completely composed of the light that was sent by the transmitter.

Free-space communication systems are less predictable than fiber optic communications. Because the light being transmitted interacts with the atmosphere, free-space systems are subject to static atmospheric data loss. In addition, a receiver is required to filter the transmitted light from any external light allowed to enter into the system to prevent corruption of the signal. Finally, the light in free-space systems is subject to further alteration through various forms of dynamic atmospheric effects, including turbulence-induced diffraction.

B. Quantum Cryptography

Quantum cryptography is a method of real time generation of a cryptographic key that is shared between remote parties having no previous contact. A cryptographic key is a sequence of bit values (zeros and ones) in a particular unpredictable or random order. If two people share a cryptographic key, they can use that key with any one of a number of methods to communicate secretly. That is, they can communicate with relatively high confidence that a person intercepting their communication will be unable to decrypt and access the underlying data.

The problem with cryptographic keys is how to transmit a key from one user to another. With most methods of key distribution, it is possible in principle for an eavesdropper to intercept the users' transmission and determine the key the users have generated, either mathematically or through other means. With quantum cryptography, however, the initial key exchange is accomplished in such a way that it is believed to be impossible for any eavesdropper to reconstruct the content of the key. Because it is physically impossible, even in principle, to break a properly implemented quantum cryptography system, it is currently believed that quantum cryptography provides unconditional secrecy.

One of the tenets of quantum mechanics is the Heisenberg Indeterminacy Principle (also referred to as the Heisenberg Uncertainty Principle). According to the Principle, measurement of a state of an individual elementary particle, such as an electron or photon, changes the physical state of that particle. Although the present application will refer to the particles as photons and the beams that carry them as light beams or laser beams, one of ordinary skill in the art will recognize that other elementary particles, such as electrons, may also be used.

In most approaches to quantum cryptography, a stream of photons are prepared at a transmitting end in a particular physical state. The photons are transmitted one after another in a series of quantum bits ("qubits"). Each qubit has a value of either 0 or 1, depending on its polarization state. The transmitter randomly selects a "basis" (fiducial coordinate system with respect to which polarization directions are defined) in which the transmitted photons are polarized. The stream of photons is transmitted through a communications channel. The communications channel may be, for example, air. If an eavesdropper attempts to intercept the stream of photons, the state of an intercepted photon will change as a consequence. When the eavesdropper changes the state of the photon, the data carried by the photon is lost and the transmission no longer produces viable information. Only a receiver who can communicate and compare polarization basis choices with the sender can accurately detect the photon stream without losing the significance of the data. Once the receiver receives the data, the receiver can interpret the zeros and ones carried in the qubits to form a key.

C. Wavelength Division Multiplexing

Quantum cryptography works by exploiting certain properties of quantum mechanics, and this typically requires that the transmitting laser beam have an average intensity of one photon per pulse or less. Uniplex laser communications result in inadequate data rates, because they utilize only one laser beam and cannot increase the data rate past the arrival of one photon per pulse, and since the pulse rate is constrained by the speed with which individual photons can practically be detected.

One method that increases the throughput of optical communications while maintaining a single transmitter and receiver is wavelength division multiplexing ("WDM"). In WDM, multiple light sources of different wavelengths are encoded, or modulated, with specific data. Each wavelength of light may carry different information. The modulated beams of different wavelengths are then combined into a single output beam for transmission. At the receiving end, wavelength filters are used to separate the different light beams. In this manner, the data carried by each beam can be separately analyzed.

Combining multiple beams of different wavelengths increases the throughput of the communication system. However, there is a limit to the increased throughput. As more wavelengths are combined into a single beam, the colors, defined by the wavelengths, begin to bleed together. This problem is called "cross-talk." As cross-talk becomes greater, more data is lost. This creates an upper limit on the amount of data that is capable of being sent through WDM.

II. Wave Vector Division Multiplexing

Wave vector division multiplexing ("WVDM") is a scalable method of increasing the throughput in a laser communications system. That is, wave vector multiplexing allows an increase in the number of bits per second transmitted by the system through spatial multiplexing. The number of channels that can be transmitted at one time using WVDM is effectively limited by the aperture of the sending/receiving optics. In traditional spatial multiplexing which involves multiple standalone systems, each channel to be sent requires its own transmitter and receiver. Essentially, the traditional multiplex spatial system is a combination of complete uniplex systems. This method becomes resource prohibitive for large numbers of beams. One of the many differences between WVDM and traditional spatial multiplexing is that all the light sources in WVDM share the transmitting and receiving optics. This decreases the cost and space required for the multiplexing; however, it increases the complexity.

As mentioned above, a free space implementation is more challenging than a fiber optic implementation, because a receiver is required to separate the transmitted photons from all other photons received by the receiver. WVDM adds to the challenge, since there is a multiplicity of distinct beams to be detected by the receiver. For clarity, individual laser beams created by a laser bank will hereafter be referred to as "beamlets," while an aggregate beam created from the combination of the beamlets will be referred to as a "beam."

FIG. 1 is a block diagram of a communication system 100 in accordance with an embodiment of the invention. System 100 includes a transmitter 101 and a receiver 103. Transmitter 101 includes laser bank 112, transmit module 102 and transmit optics 104. Receiver 103 includes receive optics 106, receive module 108 and detector 109. Transmit optics 104 includes an entrance 105, and receive optics 106 includes an exit 107. As depicted in FIG. 1, transmitter 101 also includes a data control module 112, a timing laser 113 and lens assembly 116. Receiver 103 also includes lens assembly 118, sensor 120 and data acquisition module 122.

Data control module 112 generates a precise clock signal 111 that is used for timing of system 100. Clock signal 111 drives timing laser 113 to produce a pulsed laser timing signal 115. Pulsed laser timing signal 115 is a high intensity laser clock signal that is transmitted to sensor 120 in receive 103. Data control module 112 also provides clock signal 111 as well as the data to be transmitted by system 100 to laser bank 112.

On the side of receiver 103, sensor 120 receives timing signal 115. Sensor 120 includes an optical detector as well as timing electronics. In response to timing signal 115, sensor 120 provides a clock signal 117 to detector 109 for use in detecting the signals transmitted by transmitter 101. Sensor 120 also provides clock signal 117 to data acquisition module 122. Data acquisition module 122 is responsible for reconstructing the data signal received from transmitter 101.

Figure 4:
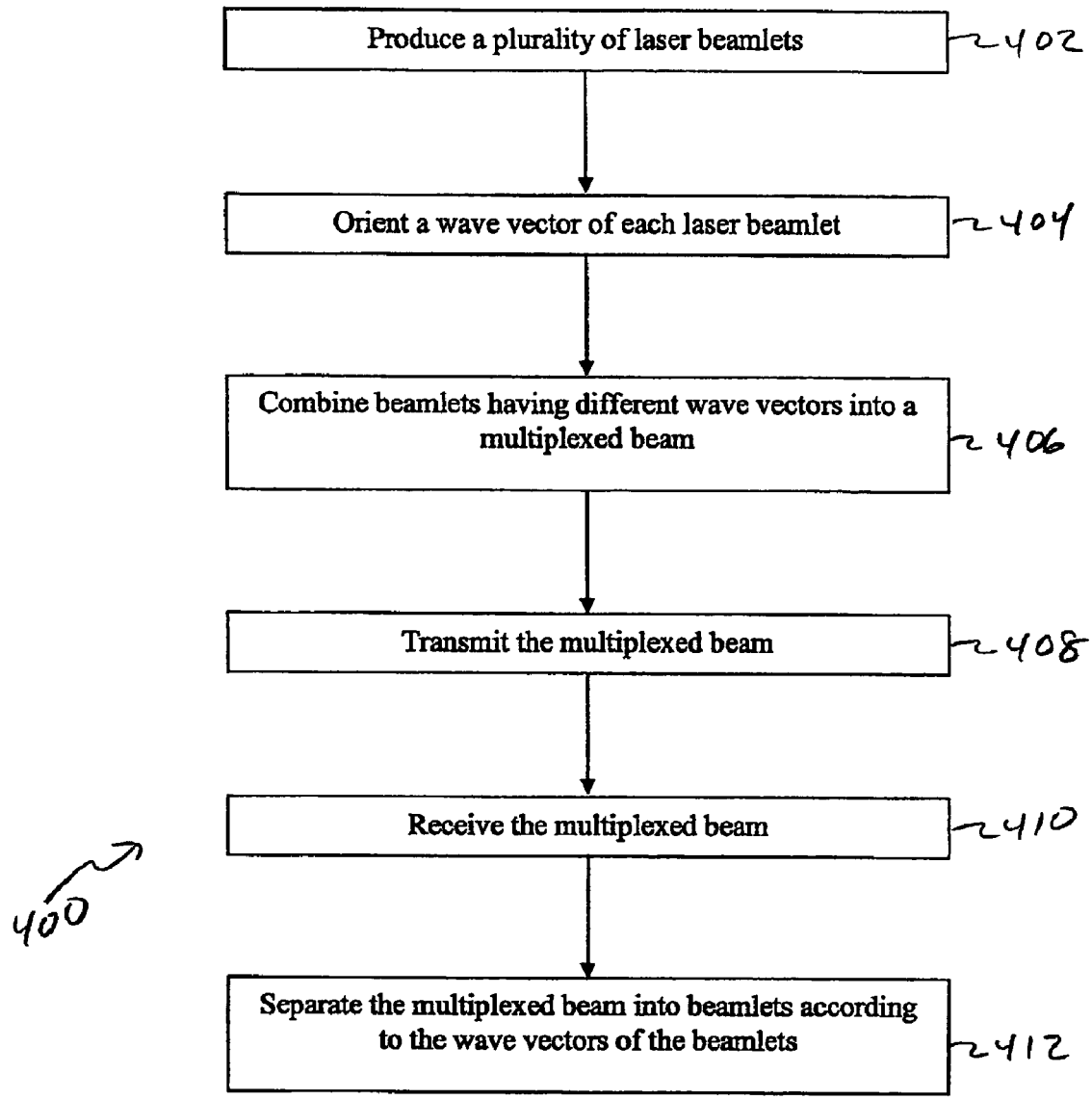
FIG. 4 is a flowchart of a WVDM method according to an embodiment of the present invention.

FIG. 4 is a flowchart of a WVDM method 400 according to an embodiment of the present invention. WVDM method 400 is described using multiplexing system 100 of FIG. 1 as an example implementation. A person skilled in the relevant art will recognize that other implementations and other WVDM methods may be used without compromising the spirit and scope of the present invention.

Referring now to FIG. 4, in step 402 of WVDM method 400, a plurality of laser beamlets is produced. For example, transmit module 102 receives a plurality of beams 110 from laser bank 112. Although the sources will be described herein as lasers, a person skilled in the relevant art will recognize that other electromagnetic sources of suitable wavelength may be used.

In step 404, a wave vector of each laser beamlet is manipulated through a controlled process to change the orientation of the wave vector. A wave vector is a vector that characterizes the direction in which a wave physically moves. The wave vector has units of inverse length, and its orientation and magnitude characterize the state of the wave. In the present embodiment, the wave vector is manipulated with a series of mirrors (see wave vector controller 204 discussed below) in transmit module 102. In other embodiments, lenses or a combination of lenses and mirrors may be used. Each laser beamlet is given a unique wave vector orientation.

Figure 2A:
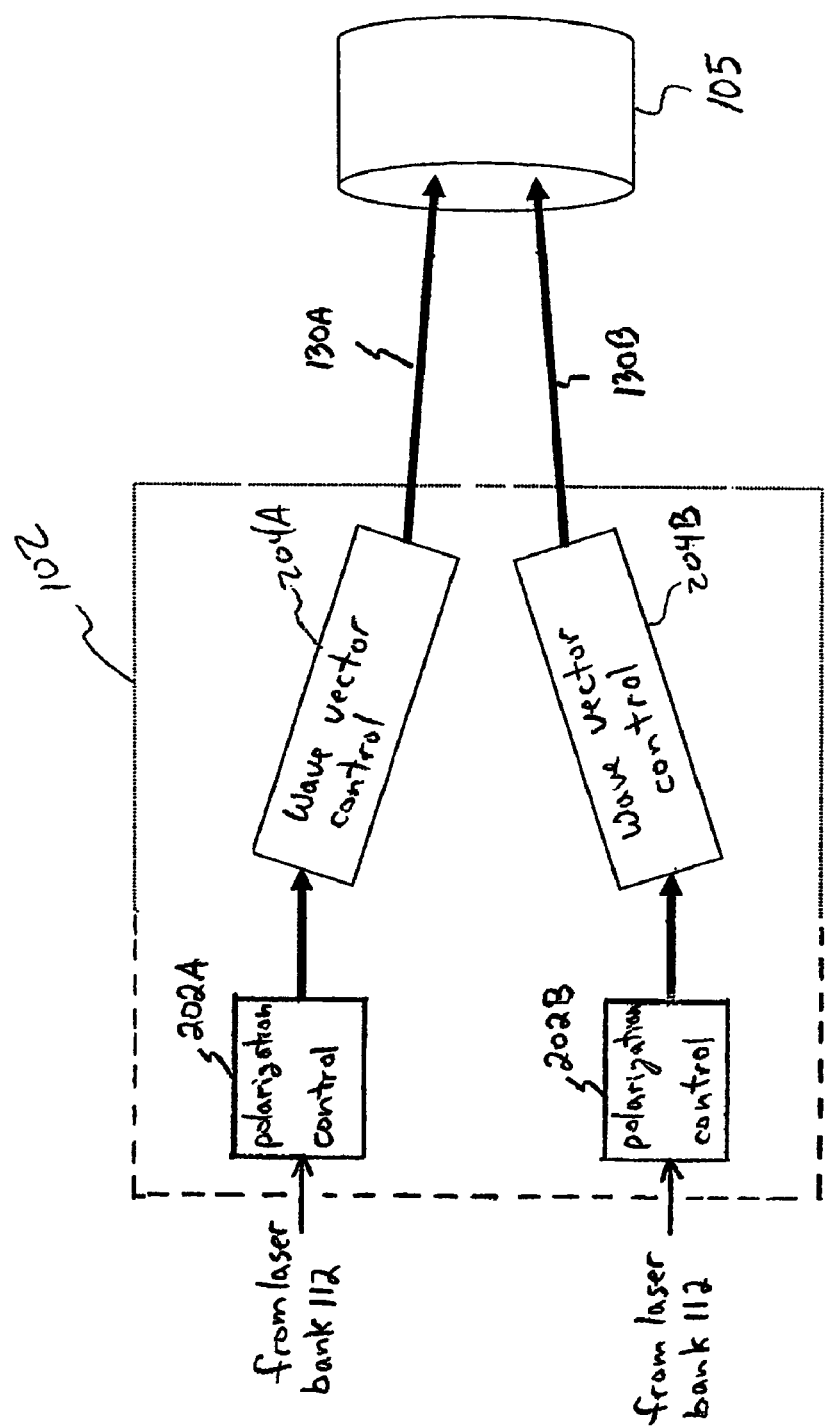
FIG. 2A is a block diagram of a transmit module according to an embodiment of the present invention.

For example, after receiving the plurality of laser beamlets 110 from laser bank 112, transmit module 102 alters the wave vector of each individual laser beamlet. FIG. 2A is a block diagram of an example transmit module (or beam combiner) 102. In this example, transmit module 102 includes polarization controllers 202A,202B and wave vector controllers 204A,204B. Laser beamlets from polarization controllers 202 are received from laser bank 112. Polarization controllers 202 encode the data to be transmitted into the polarization of the photons of the beamlets. Each beamlet is then passed to wave vector controllers 204. One of skill in the pertinent art will recognize that additional polarization controllers and wave vector controllers may be added to produce additional beamlets.

Figure 2B:
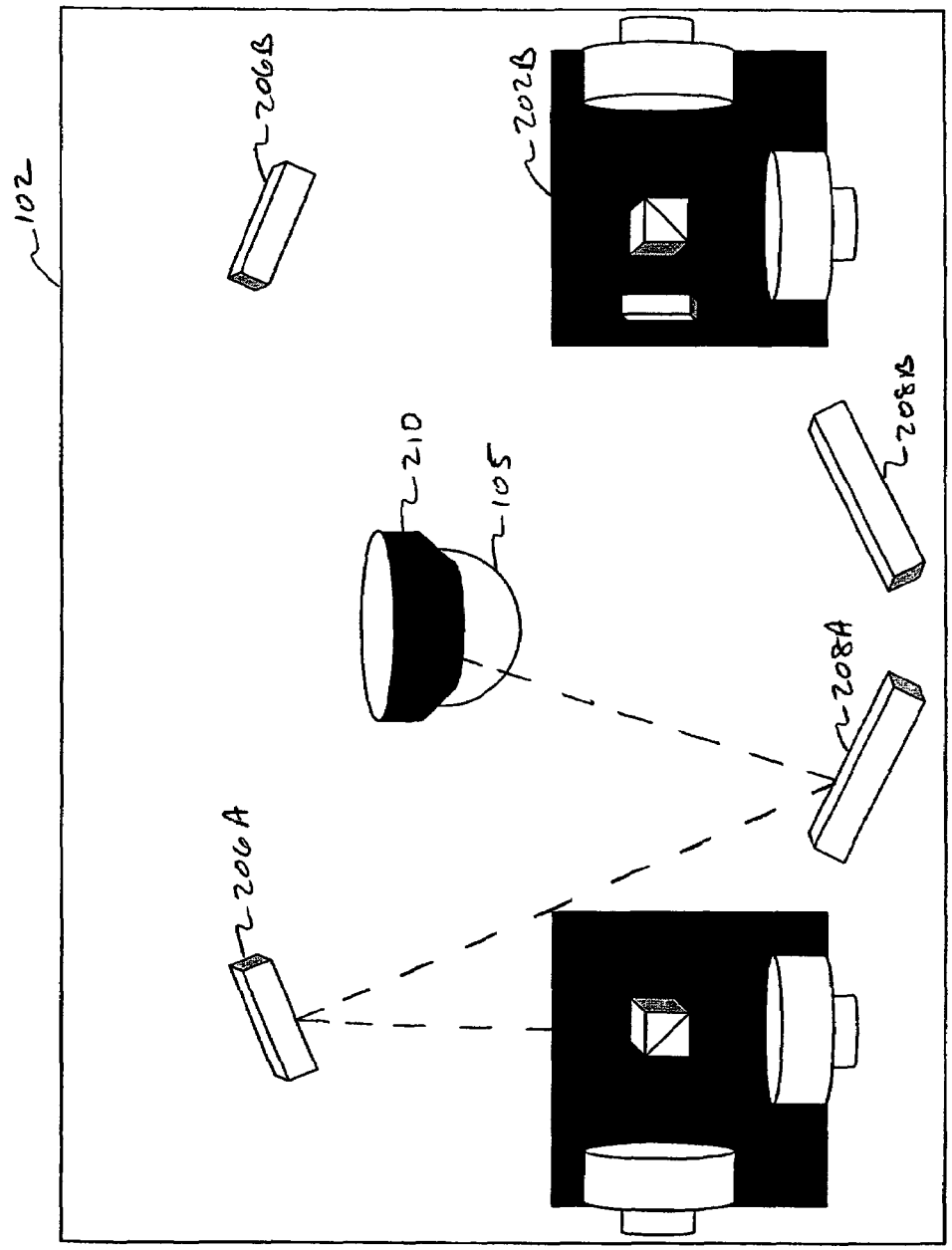
FIG. 2B is a simplified diagram of a wave vector controller according to an embodiment of the present invention.

FIG. 2B is a diagram illustrating an example structure of each wave vector controller 204. As illustrated, the embodiment of FIG. 2B would produce two WVDM beamlets. Each wave vector controller 204 includes a first mirror 206 and a second mirror 208. For example, wave vector controller 204A is separated into mirrors 206A and 208A, while wave vector controller 204B is separated into mirrors 206B and 208B. Mirrors 206A, 208A, 206B and 208B are precisely configured to arrange the angular orientation of the wave vectors of the quantum bit photons of the beamlet passing therethrough. This orientation of the wave vectors of the quantum bits of the beamlet allows the beamlet to propagate through the transmit optics and the quantum channel path (e.g., free space), and to still be properly oriented to allow entrance into the receiving module optics and pass through to the appropriate detector (described below). A directional mirror, such as mirror 210, may redirect the beamlets into transmitter entrance 105.

Mirrors 206A, 208A, 206B, and 208B manipulate the wave vector of each laser beamlet in a controlled manner. Mirrors 206A, 208A, 206B, and 208B can be adjusted to achieve a particular wave vector orientation. An example beam path is illustrated by the dotted line in FIG. 2B As would be apparent to a person skilled in the relevant art, precision mirror mounts can be used to achieve precise positioning and adjustment of the mirrors.

In the current embodiment, the wave vectors of all laser beamlets from laser bank 112 are changed through their respective mirror series to point in a slightly different direction. These directions may be close to parallel once the laser beamlets reach transmitter entrance 105. One skilled in the relevant art will recognize that, with calculation and/or empirical testing, placement and angles of all mirrors in a particular mirror series can be determined to obtain a specific wave vector for a specific laser beamlet.

In step 406 of WVDM method 400, the beamlets, each of which has a different wave vector, are combined into an aggregate, multiplexed beam. The wave vectors in the aggregate beam are distributed around an average wave vector that points towards receiver 103. In example transmit module 102, the beamlets are combined at transmitter entrance 105. The resulting aggregate beam has an aggregate wave vector pointing toward receiver 103.

In step 408, the multiplexed beam is transmitted by transmit optics 104. Transmit optics 104 receive the aggregate beam from transmit module 102 and focuses it toward receiver 103. Any adjustment to the transmit beam caused by transmit optics 104 should be taken into account when determining the angles of mirrors 206,208 in wave vector controller 204 to result in the desired wave vector orientation of a particular beamlet. The focused multiplexed beam is output from transmitter 101 as output beam 114. Output beam 114 is made up of individual beamlets having individual wave vectors. The average wave vector associated to output beam 114 points from transmitter 101 to receiver 103.

Figure 11:
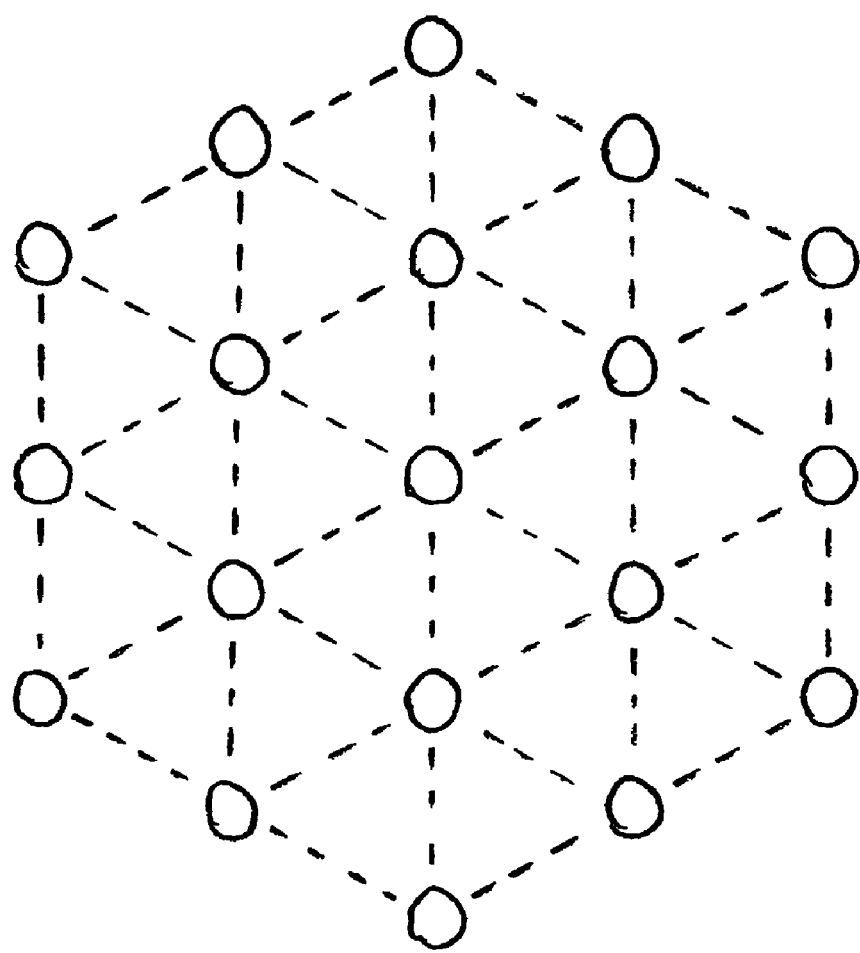
FIG. 11 is a diagram illustrating a sample hexagonal array of optical transmitting or detecting nodes in accordance with an example embodiment of the invention.

In the example of FIG. 1, only two beamlet paths are shown for simplicity. However, one of ordinary skill in the relevant art will recognize that any number of individual beamlets can be included in the output beam. For example, FIG. 11 shows a sample hexagonal array of optical transmitting or detecting nodes. Such an array pattern could be used to, for example, transmit nineteen separate beamlets multiplexed into one transmitted laser beam using only one transmit optics 104 and one receive optics 106. Each "channel" would, of course, have its own wave vector controller 204 to give the respective beamlet a unique wave vector orientation to permit discernment of each beamlet at detector 109 of receiver 103.

In one embodiment, output beam 114 may propagate through an atmospheric medium, such as in ground-to-ground communications or ground-to-satellite communications. In another embodiment, output beam 114 may propagate through a vacuum or near-vacuum, such as in some satellite-to-satellite communications. In yet another embodiment, output beam 114 may propagate through a medium such as an optical fiber. In this case, the wave vectors correspond to different modes of the fiber or other medium.

As can be seen in FIG. 1, the different orientations of wave vectors cause the beamlets 130A and 130B to cross paths during their transmission. The path of beamlet 130B is represented by dotted lines in output beam 114. The path of beamlet 130A is represented by solid lines in output beam 114. This crossing of paths does not affect the data carried in the different beamlets as long as the paths are not crossing at the same time they enter receive optics 106. In the example shown in FIG. 1, the wave vectors of beams 130A and 130B are controlled so that the paths cross approximately halfway through the transmission distance. One of ordinary skill in the relevant art will recognize that other geometries including those with non-intersecting beam center lines are possible.

In step 410, the multiplexed beam is received. Referring to FIG. 1, receive optics 106 receives output beam 114, and transmits output beam 114 to receive module 108. Receive optics 106 must have an appropriately sized aperture to accept output beam 114. If an imaginary envelope is considered to surround all the beamlets in output beam 114, optimal performance is achieved when the aperture of receive optics 106 is equal to or larger than the size of the envelope. The size of the envelope at the receiving end of the transmission may be larger than the size of the envelope at the transmitting end of the transmission. This is because the spot size of output beam 114 may change as the beam exits transmit optics 106 and propagates toward receive optics 106.

There are two reasons for this increase in beam spot size. First, it is a property of light that light beams diffract when they exit apertures of finite size. When each of the separate beamlets in output beam 114 exits transmit optics 106, it will diffract as a result of this phenomenon.

Secondly, the medium through which the beamlets are transmitted may cause additional diffraction. For example, if the beamlets are transmitted through air, then atmospheric turbulence will cause the individual beamlets to diffract. The diffraction suffered by the individual beamlets causes their spot sizes to increase, which in turn increases the spot size of output beam 114. In addition, specifically due to atmospheric turbulence, the beamlets begin to "wander" due to interaction with particles in the atmosphere that causes their wave vectors to change slightly. This wander causes the center of output beam 114 to move along a statistically random path varying about a time-averaged centroid. Receive optics 106 must accommodate for such movement. Maximum movement can be calculated for any transmission distance chosen. This is different from uniplex systems. Since uniplex systems have only one beam, there is no cross-talk resulting from the wander of the beam.

Figure 3:
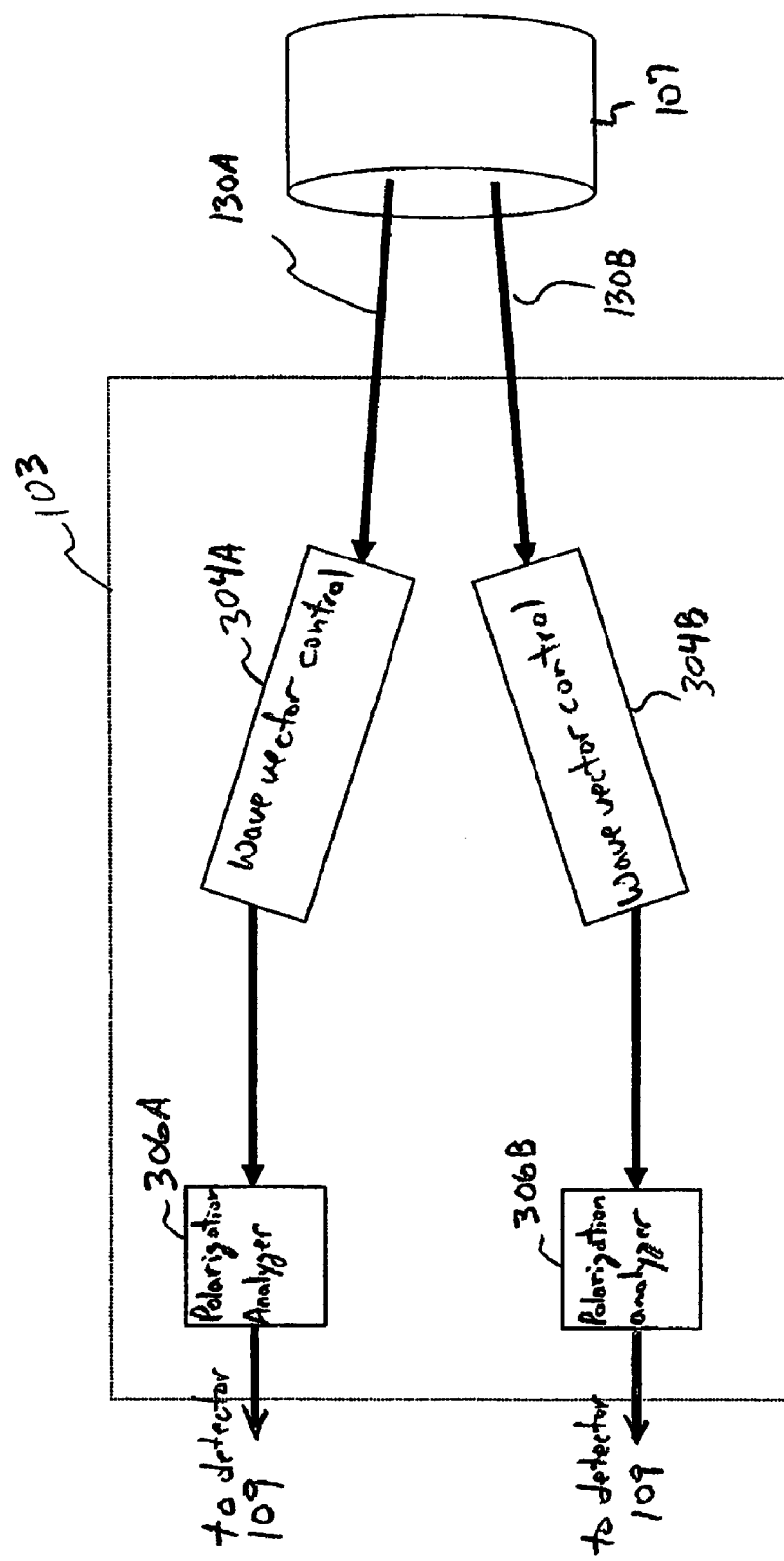
FIG. 3 is a block diagram of a receive module according to an embodiment of the present invention.

In step 412, the multiplexed beam is separated into beamlets according to the unique wave vectors of the beamlets. In the present embodiment, this step is accomplished in receive module 108. FIG. 3 is a block diagram of an example receive module 108. Although receiving optical module 108 is shown as processing only two beamlets, one of ordinary skill in the relevant art will recognize that any number of beamlets may be processed. Because each individual beamlet of output beam 114 has a slightly different wave vector, each beamlet falls upon a different series of separating mirrors in receive module 108. For example, as illustrated in FIG. 3, beamlet 130A falls upon wave vector controller 304A, while beamlet 130B falls upon wave vector controller 304B. Wave vector controllers 304 are similar in structure to wave vector controllers 204, shown in FIG. 2B. Each mirror series of wave vector controllers 304 separates its corresponding beamlet from the other received beamlets, and directs the beamlet into a corresponding polarization analyzer 306. For example, wave vector controller 304A directs beamlet 130A into polarization analyzer 306A. Similarly, wave vector controller 304B directs beamlet 130B into polarization analyzer 306B.

Detector 109 (see FIG. 1) includes a plurality of detectors (i.e., one detector per channel). Depending on the application, detector 109 may include photon detectors, computer processors, imagers, and/or any other type of light processing device. Through these detectors, data carried within the beamlets can be interpreted. Since WVDM allows for multiple streams of data to arrive simultaneously, the throughput is increased over uniplex systems.

III. Application of WVDM to Quantum Cryptography

A. Method and System Components

The use of WVDM in quantum cryptography allows for high speed quantum cryptography. As discussed above with respect to traditional quantum cryptography, the nature of quantum cryptography requires the sources to output a stream of individual particles. In current quantum cryptography protocols, lasers typically output light at an average intensity of one photon per pulse or less, and the pulse rate is constrained by the speed at which individual photons can be counted.

In the example discussed herein, infrared light is used for the transmission. Infrared light is well-suited for quantum cryptography for two reasons. First, which also applies to any optical communication, the atmosphere is often more transparent to infrared light (and visible light) than light in other parts of the spectrum. Second, since infrared light is not part of the visible spectrum, an outsider will not know that a transmission is being sent unless the outsider can detect infrared light in the immediate transmission path. This is important, since system alignment is established and maintained through the use of moderately strong beams. Because of this, quantum cryptography communications sent using infrared light will be relatively covert.

Quantum cryptography using WVDM will be discussed herein with reference to a particular embodiment used in a particular quantum cryptography protocol. A person skilled in the relevant art will recognize that this embodiment is merely used as an example for descriptive purposes, and that the invention is not limited by the example used herein. Other embodiments not specifically addressed herein may also be suitable to carry out the present invention. Further, the present invention can be used in various quantum cryptography protocols without significant changes from the embodiment described herein. Moreover, the invention can be used as well in non-quantum cryptographic laser communications systems.

Figure 5:
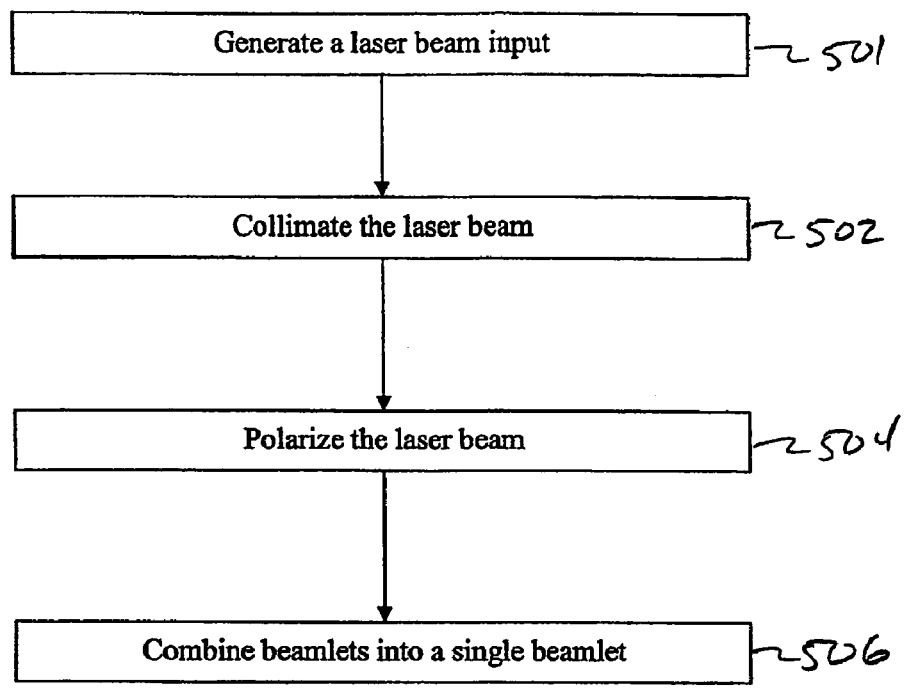
FIG. 5 is a flowchart of a beam generation method according to an embodiment of the present invention.
Figure 6:
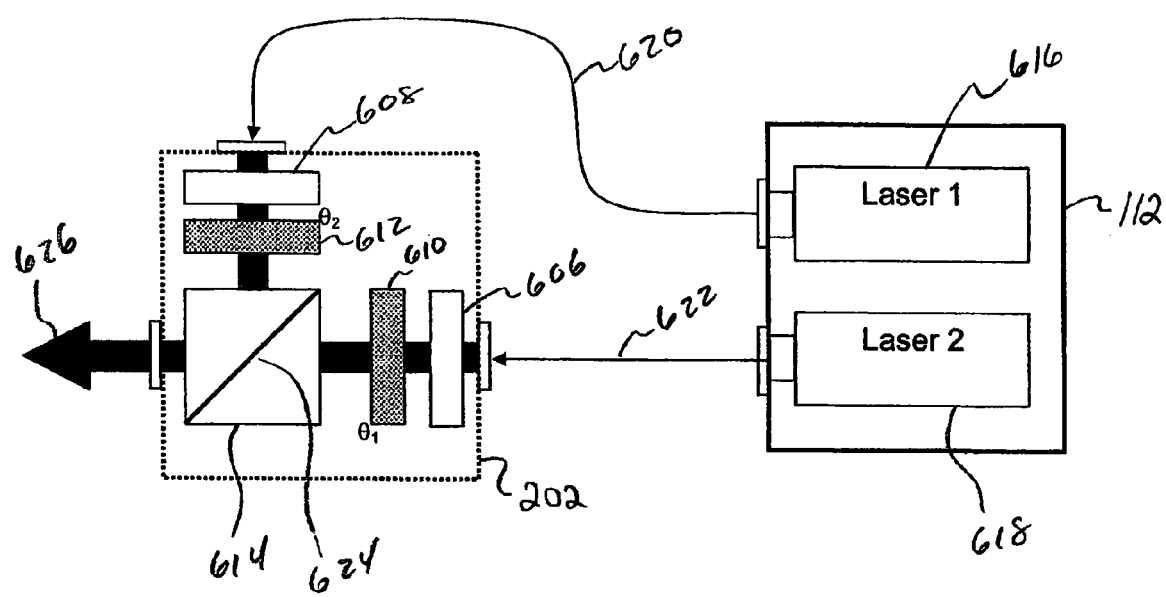
FIG. 6 is a block diagram of a transmitting optical system according to an embodiment of the present invention.

In step 402 of WVDM method 400, a plurality of laser beamlets is produced. When WVDM method 400 is used for quantum cryptography, step 402 includes several substeps. FIG. 5 is a flowchart of a beam generation method 500, which is an embodiment of step 402. In the embodiment of method 500, a plurality of laser beamlets is produced for quantum cryptographic purposes. Method 500 will be described with reference to both FIGS. 5 and 6. FIG. 6 is a block diagram of an example polarization controller 202 shown in communication with laser bank 112. Polarization controller (encoder) 202 includes collimators 606 and 608, polarizers 610 and 612, and a beamsplitter 614.

In step 501 of method 500, laser beam input is generated by, for example, laser bank 112. The two lasers 616,618 of laser bank 112 shown in FIG. 6 correspond to a single quantum cryptography channel. One skilled in the relevant art will recognize that laser bank 112 may include a different quantity of lasers depending on the quantum cryptography protocol used. If a different quantity of lasers is used in laser bank 112, polarization controller 202 can be modified accordingly.

In step 502 of method 500, the beamlets output by each laser are collimated. Referring to FIG. 6, input beamlets, such as beamlet 620 and beamlet 622, enter polarization controller 202. Beamlets 620 and 622 may enter polarization controller 202 by means of optical fibers. Collimator 606 focuses beamlet 622 so that beamlet 622 will be approximately centered on the face 624 of the beamsplitter 614. Similarly, collimator 608 focuses beamlet 620 so that beamlet 620 will also be approximately centered on the face 624 of the beamsplitter 614.

In step 504 of method 500, the collimated beamlets are polarized. For example, collimated beamlet 622 is polarized by polarizer 610, and collimated beamlet 620 is polarized by polarizer 612. In the present embodiment, polarizer 604 is a linear polarizer. Other polarizations may be used in other embodiments. Polarizer 610 is characterized by its polarization angle $\theta_1$. Polarizer 612 is characterized by its polarization angle $\theta_2$. For quantum cryptography purposes, polarization angles $\theta_1$ and $\theta_2$ are different. Polarization angle $\theta_1$, for example, may be set to any angle; however, polarization angle $\theta_2$ is offset from polarization angle $\theta_1$ by a fixed amount. One of ordinary skill in the relevant art will recognize that this fixed amount of offset between the polarization angles depends on the quantum cryptography protocol used. For example, in the present embodiment, $\theta_1$ may be equal to zero and $\theta_2$ may be equal to $\pi/4$ radians.

Lasers 616,618 are controlled by data control module 112 (see FIG. 1). Sending a pulse from laser 616 will produce an output beamlet having a first polarization angle (e.g., $\theta_2$), while sending a pulse from laser 618 will produce an output beamlet having a second polarization angle (e.g., $\theta_1$). Data control module 112 can use these different polarization angles to represent binary ones and zeros and thereby encode data.

In step 506, beamlets 620 and 622 are combined. This may be performed by, for example, beamsplitter 614 in polarization controller 202. In the embodiment shown in FIG. 6, beamsplitter 614 is a beamsplitting cube. Beamsplitting cube may be, for example, a calcite beamsplitting cube. In another example, beamsplitter 614 is a tourmaline beamsplitting cube. Beamsplitter 614 combines the part of beamlet 620 reflected by beamsplitting face 624 with the part of beamlet 622 transmitted by beamsplitting face 624, This produces polarized beamlet 626. It is this polarized beamlet whose wave vector is oriented in step 404 of WVDM method 400.

In this embodiment, mirrors in the polarization controller 202 and in wave vector controller 304 are high quality mirrors with optical coatings. These coatings preferentially reflect light most efficiently in the desired wavelength. For example, in an embodiment utilizing light of 850 nm, the special mirror coatings preferentially reflect at a wavelength of 850 nm. At the same time, the mirror coatings may also allow reflection of light from wavelengths approximately equal to 850 nm. The coated mirrors are placed at specific angles to manipulate the wave vector of their corresponding beamlet in a controlled manner and combine the multiple beamlets into a multiplexed beam.

The multiplexed beam is transmitted to receiver 103 in the same manner as discussed above with respect to step 408 in WVDM method 400.

Once the multiplexed beam has been received by receiver 103, the multiplexed beam is separated into its beamlet components. This separation may be performed, for example, in a manner similar to that described with respect to step 412 in WVDM method 400. After separation, the beamlets are analyzed to determine their polarization information.

Figure 7:
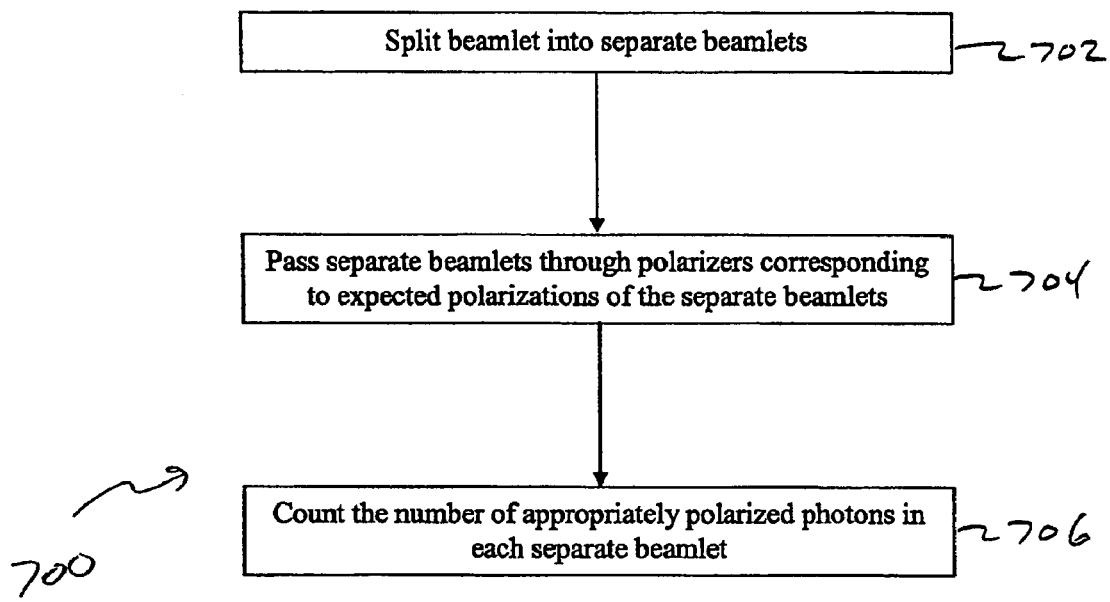
FIG. 7 is a flowchart of a polarization analysis method according to an embodiment of the present invention.
Figure 8:
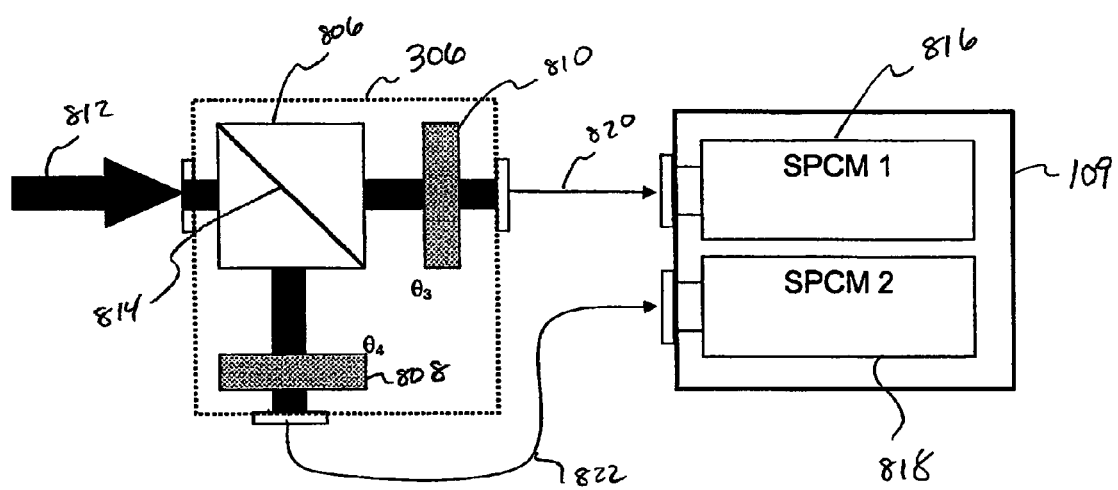
FIG. 8 is a block diagram of a receiving optical system according to an embodiment of the present invention.

FIG. 7 is a flowchart of a polarization analysis method 700, in which a separated laser beamlet is analyzed. Method 700 will also be described with reference to FIG. 8, which is a block diagram of a polarization analyzer 306 in communication with a detector 109, designed to analyze the separated beamlet for use in quantum cryptography. Polarization analyzer 306 includes a beamsplitter 806 and polarizers 808 and 810.

In step 702 of method 700, an input beamlet 812 is split into separate beamlets using, for example, beamsplitter 806. As with polarization controller 202, beamsplitter 806 may be a beamsplitting cube.

In step 704 of method 700, each separate beamlet is passed through a polarizer that corresponds to an expected polarization state of each separate beamlet. For example, photons in beamlet 812 that are reflected by beamsplitter face 814 pass through polarizer 808. The photons are then transmitted to detector 816 in detector bank 804. The photons may be transmitted to detector 816 via an optical fiber 820. Similarly, photons in beamlet 812 that are transmitted by beamsplitter face 814 pass through polarizer 810. The photons are then transmitted to detector 818 in detector bank 804. The photons may be transmitted to detector 818 via an optical fiber 822.

Polarizers 808 and 810 are oriented so as to correspond with the polarization state given to beamlet 812 at its polarization encoder. Polarizer 810 is characterized by its polarization angle $\theta_3$. Polarizer 808 is characterized by its polarization angle $\theta_4$. The offset between polarization angles $\theta_3$ and $\theta_4$ is determined by the quantum cryptography protocol used. For example, in the present embodiment, $\theta_3$ is selected to be $\pi/2$ radians and $\theta_4$ is selected to be $3\pi/4$ radians.

In step 706, the photons that arrive at the detectors are registered. If the photons analyzed by the optical system are of the correct polarization, the detectors will register a "click," and the qubit information carried by the photon can be interpreted by data acquisition module 122 (see FIG. 1).

B. Practical Implementation of a Specific Embodiment

The alignment of the various components used in WVDM is important, so it is desirable to reduce the number of independent degrees of freedom that have to be altered as the transmitter is moved to direct light toward the receiver. A specific embodiment of the present invention will now be described. One of ordinary skill in the art will recognize that there are other methods of limiting movement of various components of a WVDM system, and that the present invention is not limited by the specific embodiment described herein.

Figure 9:
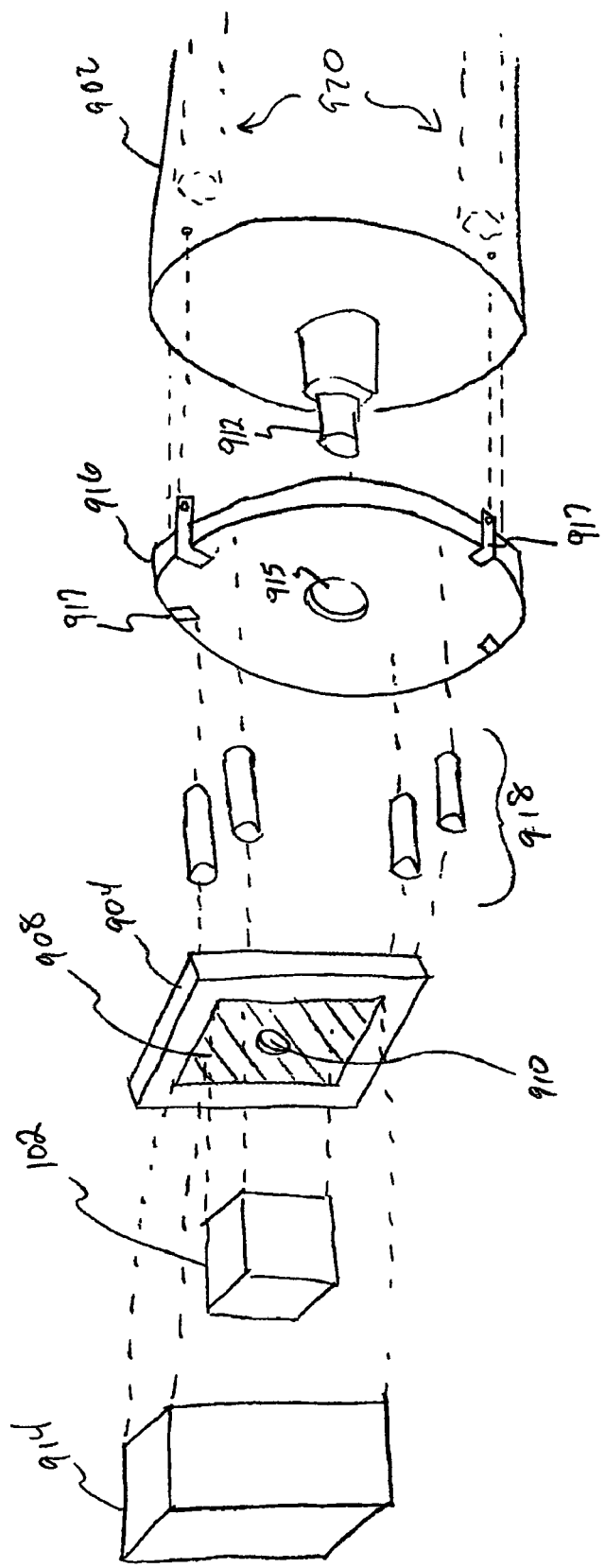
FIG. 9 is an exploded view illustrating the mounting of components to a telescope in accordance with an embodiment of the present invention.

In the example embodiment of the invention described herein, transmitting optics 104 and receiving optics 106 are telescopes. For example, suitable telescopes are 11" Schmidt-Cassegrain telescopes, model NexStar 11GPS, available from Celestron of Torrance, Calif. On the transmitter end of this example embodiment, all optical components are fixed with respect to the coordinate system of the transmitter. FIG. 9 is an exploded view of the mounting structure for mounting the transmit module 102 to the transmit optics 105, which in this case is telescope 902.

As mentioned above, each WVDM channel in quantum cryptography utilizes a polarization controller 202 (e.g., a set of collimators and polarizers in conjunction with a beamsplitter) and a wave vector controller 204. The collimators, polarizers, and beamsplitters are arranged on a miniature optical bench ("mini-bench") in a layout similar to that shown in FIG. 6. The mini-bench for each WVDM channel and the wave vector controller 204 create transmit module 102. Transmit module 102 is attached to a first baseplate 904 at location 908.

First baseplate 904 has an aperture 910. When transmit module 102 creates an aggregate beam, such as output beam 114, the aggregate beam is directed toward an eyepiece 912 through aperture 910. In order to protect transmit module 102 from external light and other disturbances, a light-tight box 914 is secured to first baseplate 904 around transmit module 102. Light-tight box 914 includes ports (not shown) that allow optical fibers to be input into transmit module 102 from laser bank 112.

A second baseplate 916 is securely fastened to the back face of telescope 902 via mounting brackets 917. Second baseplate 916 includes an opening 915 through which eyepiece 912 fits. A plurality of posts (or standoffs) 918 is attached to second baseplate 916. In turn, first baseplate 904 is attached to posts 918. In this manner, transmit module 102 is rigidly mounted to the back face of telescope 902 in such a manner that the beam output by transmit module 102 is directed into eyepiece 912. Light may be directed from transmit module 102 to eyepiece 912 via a light-tight tube (not shown).

To account for the weight added by the components attached to the back face of telescope 902 and to counterbalance telescope 902, a set of weights 920 may be added in appropriate locations to the body of telescope 902. Weights 920 may be attached, for example, to appropriate positions on or inside the casing of telescope 902.

Several types of filtering may also be included in the transmitting system. For example, wavelength filtering, temporal filtering, and spatial filtering may occur. In addition to the optical coatings on the mirrors used in the optical path of each beamlet, one or more wavelength filters may be added between transmit module 102 and eyepiece 912. The performance of the wavelength filter increases as higher quality wavelength filters are used. For example, wavelength filters having approximately 60 dB extinction outside the bandpass range (corresponding to allowing only one part in a million to be transmitted), approximately 96-98% transmission inside the bandpass range, and a bandpass range of 10 nm may be used. One of ordinary skill in the relevant art will recognize that these ranges are used as examples only, and that filters having different specifications may be used without departing from the spirit and scope of the present invention.

Temporal filtering may also be implemented. Temporal filtering causes the various events which take place photon by photon to be tightly registered in the appropriate time slot. This may be done, for example, using a digital pulse delay generator, which provides timing control for data control module 112 (see FIG. 1). For example, the digital pulse delay generator may provide picosecond timing control. During alignment and initialization of the system, the pulse delays are set so that the trigger signal to capture a photon detection event arrives at the data acquisition system 122 at the same time as the photon is registered by the detector, to within some tolerance. With temporal filtering, only events that occur during the appropriate time slot are registered; events occurring outside the appropriate time slot are ignored. This is important in quantum cryptography protocol, because successful transmission depends on the timing of the signal.

Another type of filtering which may be used is spatial filtering. Spatial filtering is a "brute force" way to keep external light out of the system. The present embodiment will be described with reference to several different types of spatial filtering. However, a person skilled in the relevant art will recognize that different combinations and other techniques of spatial filtering may be used.

Some methods of protecting a free-space communications system involve altering the environment in which the system is used. For example, one method of spatial filtering is placing the transmitter and receiver in shade. For example, a hemispherical geodesic dome tent may be used. Another spatial filter is a shade, such as an extension tube, attached to the transmitting end of the transmitter and/or the receiving end of the receiver. This helps to prevent light outside the transmission path from entering the transmitter and receiver. Superopaque casings may enclose any fiber optic cables used in the communication system to provide extra protection from ambient light.

The field of view of the transmitter and receiver can also be manipulated. In the present embodiment, wherein telescope 902 is being used as the transmitter, the field of view is adjusted so that only the aperture of the receiver is visible from telescope 902. A similar adjustment is made to the receiver. Such an adjustment may be implemented by adding an adjustable iris to eyepiece 912.

System 900 may also be protected from external disturbances by placing shock absorbers at the base of a tripod on which system 900 is mounted.

A setup similar to system 900 is implemented at the receiving end, with the receiving optical module rigid with respect to the receiving telescope.

In an example implementation of the invention using the telescopes described above, a 100 meter quantum channel (free path) length was setup between the transmitter and receiver. The telescope magnification was set to a magnification of about seventy. Empirical, iterative adjustments were then made to the system. The adjustments were made to satisfy the following constraints. The angular orientation of the wave vectors of the quantum bit photons had to be arranged on the transmit side so that they would be properly oriented for entrance into the receiving module optics and passage to the appropriate detector, after leaving the transmitting optical module and subsequently propagating through the transmit telescope optics and the quantum channel path. Suitably adjusting the wave vectors to achieve this requires great care. If the transmit optic exit angle is too large, the photons will miss the receiving telescope. If the angle is too small, the detector won't be able to separate the signals. In this example implementation, these constraints were met by angular values of: (1) the beam exiting the transmit module (at the telescope), converging at an angle of approximately seven degrees (between the two beams); and (2) diverging at approximately seven degrees when entering the telescope of the receive module. In this example, all mirrors were high quality, coated optical mirrors made by New Focus, Inc. of San Jose, Calif.

IV. Combination of WVDM and WDM

WVDM is scalable in that the number of transmission channels can be continually increased without the occurrence of cross-talk. Throughput can be even further increased by combining the methods of WVDM and wavelength division multiplexing ("WDM"). In certain embodiments, it should be possible to achieve real-time rates on the order of hundreds of megabits per second or more. This applies to quantum cryptography systems as well as optical communications systems that do not involve quantum cryptography. Rates may be even higher for such systems.

Figure 10:
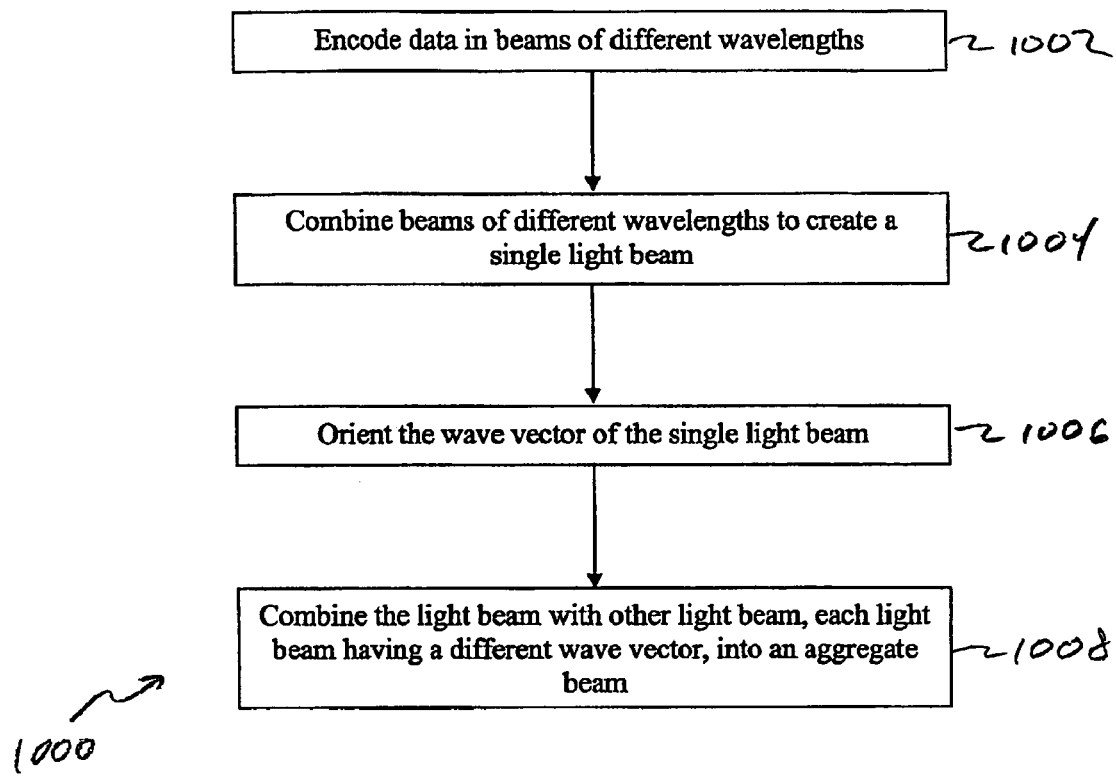
FIG. 10 is a flowchart of an optical transmission method combining WVDM and WDM according to an embodiment of the present invention.

As mentioned above, WDM increases throughput by combining multiple wavelengths of light into a single laser beam. FIG. 10 is a flowchart of a method 1000 according to an embodiment of the present invention. In step 1002, data is encoded in laser beams having different wavelengths. In step 1004, the laser beams having different wavelengths are combined into a single light beam having multiple wavelength components. This process occurs using the WDM method, which is known in the art. Steps 1002 and 1004 may be repeated to produce multiple light beams having multiple wavelength components.

The wave vector of each single light beam is oriented in step 1006. In this manner, the method of WVDM is implemented on light produced by the method of WDM. Step 1006 is performed according to, for example, WVDM method 400 described above.

In step 1008, each light beam having a unique wave vector is combined with the other light beams into an aggregate beam. At this point, each light beam has a unique wave vector and carries multiple wavelength components. The result of this is an output beam with a very high throughput of the order mentioned above.

V. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of transmitting data in a free-space laser communications system, comprising:
  (a) producing a plurality of laser beamlets, wherein each laser beamlet has a wave vector unique to that laser beamlet at a point of incidence onto a transmitter;
  (b) with the transmitter, magnifying each of the laser beamlets such that the laser beamlets in the plurality of laser beamlets at least partially overlap;
  (c) transmitting the plurality of overlapping laser beamlets as a spatially multiplexed beam through free space to a receiver, wherein each of the laser beamlets in the spatially multiplexed beam has a unique wave vector pointing towards the receiver, wherein the unique wave vector includes unique wavelength and orientation combination;
  (d) receiving the multiplexed beam having the plurality of overlapping beamlets at a receiver; and
  (e) separating the multiplexed beam into the plurality of laser beamlets according to the unique wave vectors.

2. The method of claim 1, wherein step (a) comprises:
passing each laser beamlet through a unique set of mirrors, each unique set of mirrors controlling the wave vector orientation of the respective beamlet being passed therethrough.

3. The method of claim 2, wherein step (d) comprises:
passing the laser beam through second unique sets of mirrors, each second unique set of mirrors separating a respective beamlet from the laser beam based on the wave vector orientation of that beamlet.

4. The method of claim 3, wherein each of the laser beamlets has an intensity of approximately one photon per pulse.

5. The method of claim 1, wherein the step (a) comprises:
  (i) collimating each laser beamlet;
  (ii) polarizing each laser beamlet;
  (iii) passing each laser beamlet through a beamsplitter; and
  (iv) passing each laser beamlet through a unique set of mirrors, each unique set of mirrors controlling the wave vector orientation of the respective beamlet being passed therethrough.

6. The method of claim 5, wherein step (e) comprises:
  (i) passing the laser beam through second unique sets of mirrors, each second unique set of mirrors separating a respective beamlet from the laser beam based on the wave vector orientation of that beamlet; and
  (ii) analyzing the polarization of each laser beamlet.

7. A free-space laser communications system comprising:
a plurality of lasers, each laser producing a laser beamlet;
a plurality of transmitting optical paths, wherein each laser beamlet follows a particular transmitting optical path, and wherein each transmitting optical path produces a wave vector unique to its respective laser beamlet;
a transmitting telescope configured to receive, from the plurality of transmitting optical paths, each laser beamlet having a unique wave vector, combine the plurality of laser beamlets into a spatially multiplexed laser beam through magnification such that the laser beamlets within the laser beam at least partially overlap, and transmit the laser beam, wherein each of the laser beamlets within the laser beam has a unique wave vector, wherein the unique wave vector includes unique wavelength and orientation combination;
a receiving telescope configured to receive the laser beam; and
a plurality of receiving optical paths, each receiving optical path being configured to receive a laser beamlet having a particular wave vector,
wherein the transmitting telescope is configured to transmit the laser beam through free space to the receiving telescope and wherein each laser beamlet in the laser beam has a unique wave vector pointed towards the receiving telescope.

8. The communications system of claim 7, wherein each of the laser beamlets has an intensity of approximately one photon per pulse.

9. The communications system of claim 8, wherein each transmitting optical path comprises:
a collimator;
a polarizer; and
a beamsplitter.

10. The communications system of claim 9, wherein each transmitting optical path further comprises a unique set of mirrors to control the wave vector orientation of the respective beamlet being passed therethrough.

11. The communications system of claim 9, wherein the polarizer is a linear polarizer.

12. The communications system of claim 9, wherein the beamsplitter is a beamsplitting cube.

13. The communications system of claim 12, wherein the beamsplitting cube is a calcite cube.

14. The communications system of claim 8, wherein each receiving optical path comprises:
   a collimator;
   a polarizer;
   a beamsplitter; and
   a photon detector.

15. The communications system of claim 14, wherein each receiving optical path further comprises a second unique sets of mirrors, each second unique set of mirrors separating a respective beamlet from the laser beam based on the wave vector orientation of that beamlet.

16. The communications system of claim 14, wherein the polarizer is a linear polarizer.

17. The communications system of claim 14, wherein the beamsplitter is a beamsplitting cube.

18. The communications system of claim 17, wherein the beamsplitting cube is a calcite cube.

19. A method of exchanging quantum cryptography data, comprising:
   (a) encoding quantum cryptography data in a plurality of laser beamlets, each laser beamlet having an average intensity of one photon per pulse;
   (b) multiplexing the laser beamlets by magnifying the laser beamlets such that the laser beamlets at least partially overlap to produce a multiplexed laser beam, wherein each laser beamlet in the multiplexed laser beam has a unique wave vector pointing towards a receiver, wherein the unique wave vector includes unique wavelength and orientation combination; and
   (c) transmitting the laser beam through free space to the receiver.

20. The method of claim 19, further comprising:
   (d) receiving the multiplexed laser beam;
   (e) demultiplexing the multiplexed laser beam to produce a plurality of received laser beamlets; and
   (f) decoding the plurality of received laser beamlets based on the unique wave vector of each laser beamlet.

21. The method of claim 20, wherein the step (b) comprises:
   (i) polarizing each of the laser beamlets; and
   (ii) orienting a wave vector of each laser beamlet so that the laser beamlet follows a desired path;
   wherein the step (ii) directs the laser beamlets into position for combination as the multiplexed laser beam.

22. The method of claim 20, wherein the step (e) comprises:
   (i) separating the multiplexed laser beam into a plurality of laser beamlets on the basis of the unique wave vector of received laser beamlet; and
   (ii) analyzing the polarization of each received laser beamlet.

23. A method of exchanging quantum cryptography data, comprising:
   receiving a multiplexed laser beam transmitted over free space by a transmitter to a receiver, wherein the multiplexed laser beam includes a plurality of magnified, overlapping laser beamlets, each laser beamlet having a unique wave vector pointing to the receiver from the transmitter, wherein the unique wave vector includes unique wavelength and orientation combination;
   demultiplexing the multiplexed laser beam to produce a plurality of received laser beamlets, each received laser beamlet having an average intensity of one photon per pulse, wherein each received laser beamlet in the multiplexed laser beam has a unique wave vector; and
   decoding quantum cryptography data in the plurality of received laser beamlets based on the unique wave vector of each laser beamlet.

24. The method of claim 23, further comprising prior to said receiving step:
   encoding the quantum cryptography data in a plurality of transmission laser beamlets, each transmission laser beamlet having an average intensity of one photon per pulse;
   multiplexing and magnifying the transmission laser beamlets such that the laser beamlets at least partially overlap to produce a multiplexed laser beam; and
   transmitting the laser beam over free space to a receiver.

* * * * *